Oct. 20, 1970  J. G. GIBBONS ET AL  3,534,589

FREE PARTICLE AND LOOSE OBJECT DETECTION SYSTEM

Filed Feb. 28, 1967

Inventors:
Joseph B. Gibbons,
Max W. Schulz,
by Lawrence Mitchell
Their Attorney.

United States Patent Office 3,534,589
Patented Oct. 20, 1970

3,534,589
FREE PARTICLE AND LOOSE OBJECT DETECTION SYSTEM
Joseph B. Gibbons, Schenectady, and Max W. Schulz, Scotia, N.Y., assignors to General Electric Company, a corporation of New York
Filed Feb. 28, 1967, Ser. No. 619,444
Int. Cl. G01m 7/00; G01n 29/00
U.S. Cl. 73—67                                    1 Claim

ABSTRACT OF THE DISCLOSURE

A system for detecting the presence of free particles and loose objects in an assembly is shaken and the impacts of objects and particles is electrically detected and fed into one input of an analyzing means. A signal corresponding to the frequency of the shaking is fed into another input of the analyzing means and the input signals are compared to give an indication of the condition of the assembly.

---

Our invention relates to a method and apparatus for the detection of loose objects and free particles in a system.

Assembled apparatus frequently has loose or dangling parts or contains free particles due to faulty construction or damage. By a free particle we mean one such as a drop of solder, chip of wire, or an unattached piece of insulation. By a loose object we mean one which is partially restrained such as a wire connected at one end only, a piece of sheet metal attached to a support at one end but loose at the other end, or a loose bolt. Such loose objects and free particles may cause serious trouble in the operation of the apparatus when the system is in use. For example, loose objects in an electrical circuit may cause a short circuit. It is particularly important in electronic or electromechanical units destined for use in space, missile or aircraft systems that no loose object or free particles be found in the assemblies. These items are often one time use only or inaccessible to repair and must have high reliability. Such items may perform well in static testing but fail under operating conditions. To avoid trouble from loose objects or free particles when the assembly is in operation, a device which detects these conditions in advance is helpful.

A principal object of our invention is to determine the presence of free particles and loose objects in manufactured assemblies.

Another object of our invention is to detect free particles and loose objects without damage to the assembly in which they are located and without the necessity of opening or disassembly of the apparatus.

Another object of our invention is, before actual operation, to detect the presence of free particles or loose objects which might interfere with operation of the assembly.

In brief, our system detects free particles and loose objects in an assembly of manufacture or other objects by mounting the assembly on a plate which is vibrated at accelerations in excess of one "g." Because of the acceleration and vibration imparted to the assembly, the loose objects or free particles impact against this assembly at intervals. These impacts are detected by an accelerometer. The output signal from the accelerometer is supplied through a filter which passes high frequencies to either the vertical or horizontal component of an analyzer, such as an oscilloscope. The other component of the analyzer or oscilloscope is controlled by the frequency of vibration of the plate. Free particles or loose objects in the assembly cause characteristic signals to be displayed on the oscilloscope. Extraneous signals are removed by filters and isolation structures.

Figure 1:
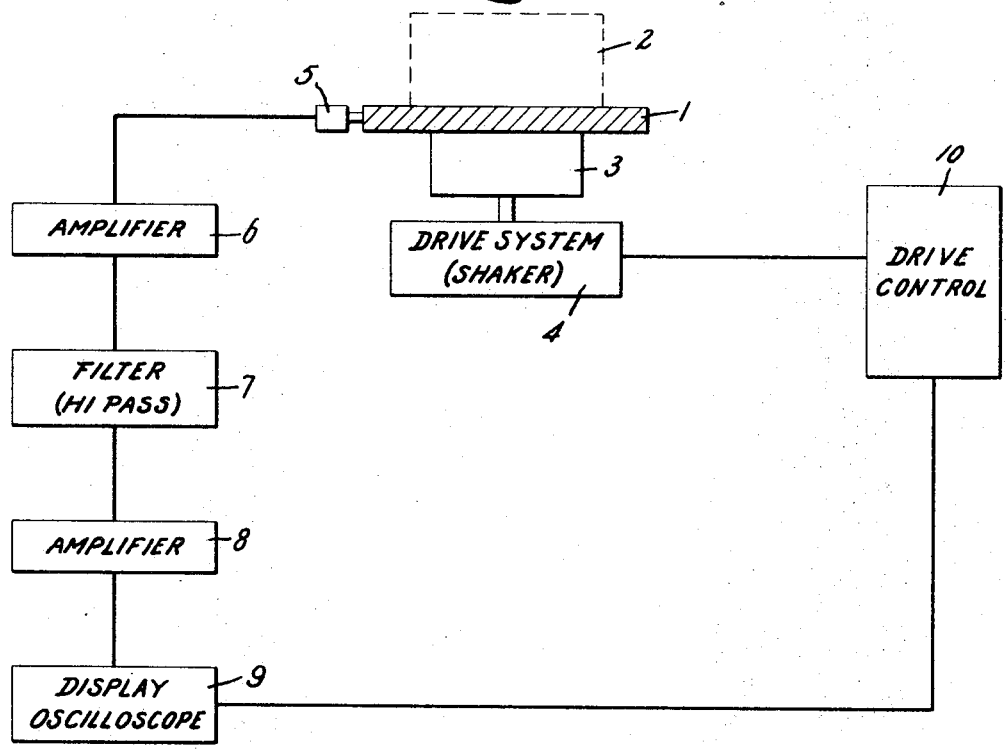
FIG. 1 shows a system designed according to our invention for free particle and loose object detection.

FIG. 1 shows a schematic diagram of the test assembly constructed to operate in a simple oscillatory manner. Included in the test assembly is a mounting plate 1 which is adapted to hold test objects 2 of varying sizes. Mounting plate 1 is supported by an isolation structure 3 which may be made of rubber, for example. Isolation structure 3 passes frequencies which are desired for vibrating the assembly but does not pass high frequencies. The high frequencies generated by the drive means or shaker 4 or for any reason existing on the drive means side of the mounting plate are not passed to the plate and reflected into the accelerometer output because the isolation structure does not pass these frequencies to the plate.

Mounted on one side of plate 1 is a high frequency vibration pick-up means such as accelerometer 5. The accelerometer 5 mounted on the plate picks up any vibrations affecting the plate such as those caused by free particles found in the assembly or any other items which cause vibration in the assembly. The signal from the accelerometer is supplied to an amplifier 6 and then to a high frequency filter 7 which eliminates any frequencies other than those due to the impact of objects upon the assembly. Next in electrical series to filter 7 is an amplifier 8 which brings vibration signals to a level which will show on an analyzing means such as oscilloscope 9. While the output signal from amplifier 8 may be supplied to either the horizontal or vertical sweep control of the oscilloscope, we have indicated in FIG. 1 that it is supplied to the vertical sweep control.

The motor drive means or shaker operates at a predetermined frequency. The period of vibration or oscillation of a loose object is related to this frequency. The frequency of the shaker or oscillator must be equal to or less than the frequency of the loose object to permit the system to distinguish a loose object from a free particle. A drive control unit 10 actuates shaker 4 and the shaker output determines the frequency of sweep of the oscilloscope as shown in the embodiment of FIG. 1. In this way the frequency of oscillation of the assembly is in synchronism with the frequency of the horizontal sweep of the oscillator. The height of the vertical component of the oscilloscope varies in accordance with the strength of the signal coming from the assembly and supplied to oscilloscope 9 through the accelerometer-filter-amplifier system.

Displayed on the oscilloscope screen is a pattern depending upon whether the particle is a free particle or a loose object. A free particle causes noise and vibration each time it impacts against the assembly. The path of the free particle varies in length as it flies about in an irregular manner. The blip or other oscilloscope indication caused by a free particle is irregular in its location and amplitude on the oscilloscope screen because the particle will fly different distances and hit with different forces. This causes the blip on the oscilloscope screen to vary in size and location.

A loose object gives a different indication because it exhibits some regularity in its period of swing. As the assembly oscillates through its cycle a loose object impacts causing vibration at some regular point in the cycle. Since the oscilloscope sweep is coordinated with the drive frequency the indication appears at a regularly recurring spot on the oscilloscope screen.

Figure 2:
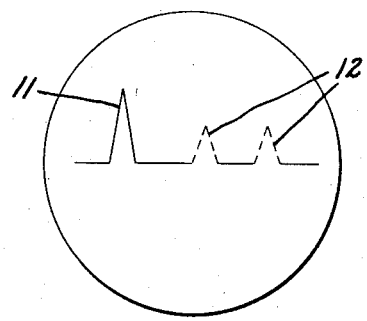
FIG. 2 shows an oscilloscope with characteristic waves on it.

As shown in FIG. 2 when oscillated a loose object gives a steady display 11 recurring at the same point in the sweep while a free particle as it flies about in a random manner and strikes the assembly at irregular times produces a display 12 which appears to move about on the oscilloscope screen.

In operation, the assembly is mounted on plate 1. Shaker 4 vibrates the plate at a rate of, for example, 20 cycles per second. Mounted between plate 1 and shaker mechanism 4 is an isolation structure which passes low frequency signals but will not pass high frequency signals. High frequency signals which are generated by the drive mechanism and other sources are similarly prevented from passing to the plate by the isolation structure. Upon being shaken each loose object at one end of its path of travel will strike some other element of the assembly thus creating a high frequency noise or vibration. High frequency vibrations created by particles in the assembly passes to the plate and are picked up by the accelerometer. Since the high frequency vibrations are the ones utilized in our invention, all low frequency signals are filtered out by high pass filter 7. The high frequency signals passed by the filter are amplified to an appropriate level and then supplied to the oscilloscope for display. An operator upon viewing the oscilloscope, thus has an indication which permits him to make any changes in the assembly if required to correct an undesired condition.

The foregoing is a description of an illustrative embodiment of the invention, and it is applicants' intention in the appended claim to cover all forms which fall within the scope of the invention.

What we claim as new and desire to secure by Letters Patent of the United States is:

1. Apparatus for detecting and differentiating between free and loose objects in an assembly comprising
    a mounting plate on which said assembly is mounted,
    a drive system for producing mechanical vibrations of a predetermined frequency, said drive system inherently producing frequencies higher than said predetermined frequency,
    means for coupling said drive system to said plate to produce vibrations of said predetermined frequency therein, said means having a structure which decouples vibrations of frequencies higher than said predetermined frequency from passing to said plate,
    an accelerometer mounted on said plate for sensing vibrations produced by movable objects impacting on said assembly and for developing electrical signals in accordance with the impacts,
    a high pass filter for passing frequency components of said signal higher than said predetermined frequency,
    an oscilloscope,
    means for amplifying said filtered signal and displaying it along one coordinate of said oscilloscope,
    mean for synchronizing the other coordinate of said oscilloscope with said predetermined frequency whereby loose objects appear on said oscilloscope as pulses fixed in position along said other coordinate, and free objects appear as pulses nonsynchronous with said predetermined frequency.

References Cited

UNITED STATES PATENTS

| | | | |
|---|---|---|---|
| 3,106,838 | 10/1963 | Crooks | 73—67.2 |
| 2,305,783 | 12/1942 | Heymann et al. | 73—67 |
| 2,685,671 | 8/1954 | Grimes | 73—67 XR |
| 3,004,662 | 10/1961 | Armstrong et al. | 73—67 XR |
| 3,182,489 | 5/1965 | Hamilton | 73—67 |
| 3,191,430 | 6/1965 | Gourley | 73—67 |

CHARLES A. RUEHL, Primary Examiner

J. R. FLANAGAN, Assistant Examiner

U.S. Cl. X.R.

73—71.4, 71.5